(12) United States Patent
Sishtla

(10) Patent No.: US 10,527,050 B2
(45) Date of Patent: Jan. 7, 2020

(54) REFRIGERANT LUBE SYSTEM

(71) Applicant: Carrier Corporation, Farmington, CT (US)

(72) Inventor: Vishnu M. Sishtla, Manlius, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 343 days.

(21) Appl. No.: 15/126,928

(22) PCT Filed: Mar. 17, 2015

(86) PCT No.: PCT/US2015/020930
§ 371 (c)(1),
(2) Date: Sep. 16, 2016

(87) PCT Pub. No.: WO2015/142825
PCT Pub. Date: Sep. 24, 2015

(65) Prior Publication Data
US 2017/0097007 A1    Apr. 6, 2017

Related U.S. Application Data

(60) Provisional application No. 61/954,781, filed on Mar. 18, 2014.

(51) Int. Cl.
*F04D 29/063* (2006.01)
*F04B 39/02* (2006.01)
(Continued)

(52) U.S. Cl.
CPC ............ *F04D 29/063* (2013.01); *C09K 5/044* (2013.01); *C10M 171/008* (2013.01);
(Continued)

(58) Field of Classification Search
CPC ...... F04D 29/063; F04D 17/08; F04D 29/056; F04D 29/059; F25B 31/002;
(Continued)

(56) References Cited

U.S. PATENT DOCUMENTS 3,838,581 A * 10/1974 Endress ................. F25B 1/053
                                                              62/468
4,213,307 A *  7/1980 Watson ................. F25B 31/004
                                                              62/192

(Continued)

FOREIGN PATENT DOCUMENTS

CN        1104318 A     6/1995
CN      202928184 U     5/2013
(Continued)

OTHER PUBLICATIONS

International Search Report and Written Opinion for application No. PCT/US2015/020930, dated May 26, 2015, 13 pages.
(Continued)

*Primary Examiner* — Emmanuel E Duke
(74) *Attorney, Agent, or Firm* — Cantor Colburn LLP

(57) ABSTRACT

In one embodiment, a compressor assembly is provided. The compressor assembly includes a compressor having an inlet, an outlet, and at least one bearing, the compressor configured to compress a first refrigerant. The assembly further includes a lubrication supply conduit fluidly coupled to the compressor and configured to supply a lubricant to the at least one bearing. The lubricant is a second refrigerant.

4 Claims, 4 Drawing Sheets

(51) Int. Cl.
*F04B 53/18* (2006.01)
*F04D 29/059* (2006.01)
*F25B 31/00* (2006.01)
*C09K 5/04* (2006.01)
*C10M 171/00* (2006.01)
*F04C 18/16* (2006.01)
*F04C 29/02* (2006.01)
*F04D 17/08* (2006.01)
*F04D 29/056* (2006.01)
*F25B 5/04* (2006.01)

(52) U.S. Cl.
CPC .......... *F04B 39/02* (2013.01); *F04B 39/0215* (2013.01); *F04B 53/18* (2013.01); *F04C 18/16* (2013.01); *F04C 29/02* (2013.01); *F04D 17/08* (2013.01); *F04D 29/056* (2013.01); *F04D 29/059* (2013.01); *F25B 31/002* (2013.01); *F25B 31/004* (2013.01); *C09K 2205/126* (2013.01); *C10N 2220/301* (2013.01); *F04C 2240/50* (2013.01); *F25B 5/04* (2013.01); *F25B 2400/05* (2013.01); *F25B 2500/16* (2013.01)

(58) Field of Classification Search
CPC .... F25B 2400/05; F25B 2500/16; F25B 5/04; F25B 31/004; F04C 29/02; F04C 18/16; F04C 2240/50; C10M 171/008; C09K 5/044; C09K 2205/126; F04B 39/02; F04B 39/0215; F04B 53/18; F04B 2220/301009; C10N 2220/301
USPC .......................................................... 62/470
See application file for complete search history.

(56) References Cited

U.S. PATENT DOCUMENTS

| | | | | |
|---|---|---|---|---|
| 5,044,167 A * | 9/1991 | Champagne | .......... | F04D 29/063 184/6.16 |
| 5,254,280 A | 10/1993 | Thomas et al. | | |
| 5,461,883 A * | 10/1995 | Terasaki | ................. | B01D 15/00 62/129 |
| 5,481,887 A * | 1/1996 | Terasaki | ................ | F04D 29/063 62/471 |
| 5,557,944 A * | 9/1996 | Hirano | .................... | C09K 5/045 252/68 |
| 5,651,257 A * | 7/1997 | Kasahara | ............ | C10M 107/34 252/68 |
| 5,881,564 A * | 3/1999 | Kishimoto | .......... | F04D 27/0292 62/193 |
| 6,176,092 B1 * | 1/2001 | Butterworth | .......... | F04D 29/023 62/193 |
| 8,163,196 B2 | 4/2012 | Basu et al. | | |
| 8,388,857 B2 | 3/2013 | Elsheikh et al. | | |
| 8,454,853 B2 | 6/2013 | Van Horn et al. | | |
| 8,574,451 B2 | 11/2013 | Hulse et al. | | |
| 2008/0207788 A1 | 8/2008 | Bowman et al. | | |
| 2008/0271477 A1* | 11/2008 | Holmes | ................. | F25B 31/004 62/468 |
| 2010/0012882 A1 | 1/2010 | Sherman et al. | | |
| 2011/0041529 A1 | 2/2011 | Chen et al. | | |
| 2011/0194960 A1* | 8/2011 | Wu | ..................... | F04D 25/0606 418/1 |
| 2011/0232306 A1 | 9/2011 | Hulse et al. | | |
| 2011/0315915 A1 | 12/2011 | Abbas et al. | | |
| 2012/0187330 A1 | 7/2012 | Singh et al. | | |
| 2012/0227266 A1 | 9/2012 | Meijer et al. | | |
| 2012/0272668 A1 | 11/2012 | Van Horn et al. | | |
| 2013/0012419 A1 | 1/2013 | Matsumoto | | |
| 2013/0096218 A1* | 4/2013 | Rached | ................. | C09K 5/045 521/170 |

FOREIGN PATENT DOCUMENTS

| | | |
|---|---|---|
| EP | 2336287 A2 | 6/2011 |
| IN | 05010DN2010 | 11/2011 |
| JP | 2012037203 A | 2/2012 |
| WO | 2012069867 A1 | 5/2012 |

OTHER PUBLICATIONS

Chinese First Office Action and Search Report for application CN 201580014231.0, dated Feb. 24, 2018, 16 pages.

\* cited by examiner

REFRIGERANT LUBE SYSTEM

BACKGROUND OF THE INVENTION

The invention relates generally to compressor systems and, more specifically, to lubrication of one or more components of a compressor for a refrigeration system.

Refrigeration systems are utilized in many applications to condition an environment. The cooling or heating load of the environment may vary with ambient conditions, occupancy level, other changes in sensible and latent load demands, and with temperature and/or humidity changes.

Refrigeration systems typically include a compressor to deliver compressed refrigerant to a condenser. From the condenser, the refrigerant travels to an expansion valve and then to an evaporator. From the evaporator, the refrigerant returns to the compressor to be compressed.

The compressor is typically provided with oil lubricant, which is utilized to lubricate bearings, seals, and gaps in the compressor. The oil is typically mixed with the refrigerant and circulated through the system. However, this may lower the viscosity of the refrigerant-oil mixture compared to oil alone, and both the bearing load carrying capacity and the oil sealing characteristics are dependent upon the oil viscosity. As such, due to lower viscosity, bearings in some systems may experience increased wear during operation. One alternative to lubricating bearings with oil includes the use of magnetic bearings, which may be costly.

Accordingly, it is desirable to provide improved lubrication for a compressor in a refrigerant system.

BRIEF DESCRIPTION OF THE INVENTION

In one embodiment, a compressor assembly is provided. The compressor assembly includes a compressor having an inlet, an outlet, and at least one bearing, the compressor configured to compress a first refrigerant. The assembly further includes a lubrication supply conduit fluidly coupled to the compressor and configured to supply a lubricant to the at least one bearing. The lubricant is a second refrigerant.

In another embodiment, a refrigeration system is provided. The refrigeration system includes a refrigerant circuit having a refrigerant conduit fluidly coupling a compressor, a condenser, and an evaporator. The compressor includes at least one bearing and is configured to compress a first refrigerant for circulation through the refrigerant circuit. The system further includes a lubricant circuit having a lubricant supply conduit fluidly coupled to the compressor to supply the lubricant to the at least one bearing. The lubricant is a second refrigerant.

In yet another embodiment, a method of lubricating at least one bearing of a compressor that is configured to compress a first refrigerant, is provided. The method includes cooling a lubricant in a cooler, where the lubricant is a second refrigerant having at least one of chlorine and an extreme pressure additive. The method further includes supplying the cooled lubricant to the at least one bearing.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
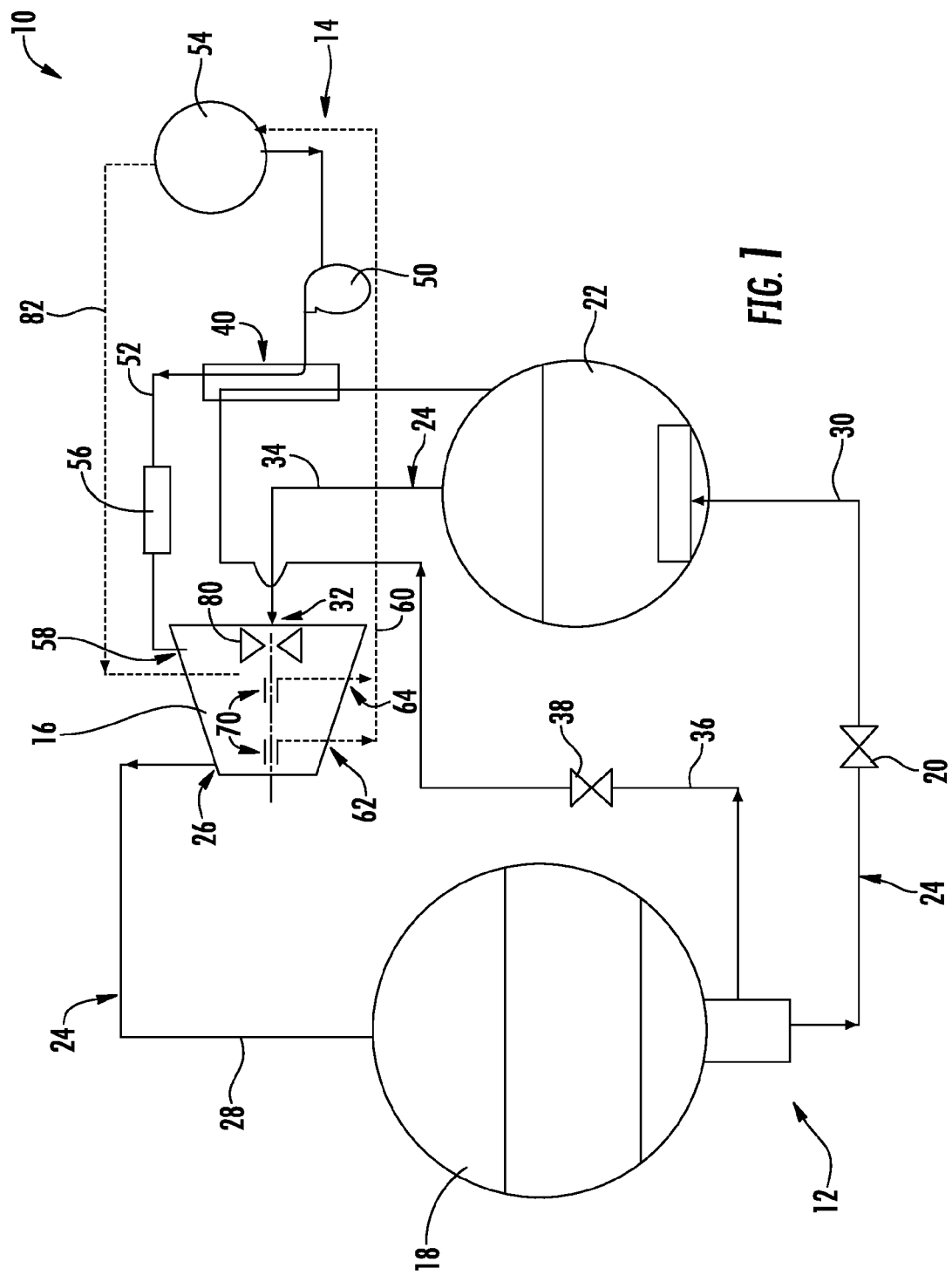
FIG. 1 is a schematic illustration of an exemplary refrigeration system.

Described herein are systems and methods for lubricating components of a compressor in a refrigeration system. A first refrigerant is utilized in a refrigerant circuit, and a second refrigerant is utilized as a lubricant in a lubricant circuit to lubricate the compressor components. Accordingly, FIG. 1 illustrates an exemplary refrigeration system 10 that generally includes a refrigerant circuit 12 and a lubricant circuit 14.

In the exemplary embodiment, refrigerant circuit 12 includes a compressor 16, a condenser 18, an expansion device 20, and an evaporator 22 that are fluidly coupled by a refrigerant conduit 24 for circulation of a refrigerant therein. As shown, an outlet 26 of compressor 16 is fluidly coupled by a conduit 28 to condenser 18, which is fluidly coupled to evaporator 22 by a conduit 30 that includes expansion device 20. Evaporator 22 is fluidly coupled to a compressor inlet 32 by a conduit 34. A branch conduit 36 is fluidly coupled between condenser 18 and evaporator 22 and includes an expansion device 38 and a heat exchanger or cooler 40. In the exemplary embodiment, cooler 40 is a brazed plate heat exchanger. Alternatively, cooler 40 may be any suitable heat exchanger that enables system 10 to function as described herein.

Lubricant circuit 14 includes a pump 50 to provide lubricant through a supply conduit 52 from a reservoir 54, through cooler 40 and a filter 56, and to a lubricant inlet 58 in compressor 16. A return conduit 60 returns lubricant from compressor lubricant outlets 62, 64 back to reservoir 54. However, rather than conventional oil lubricant, the lubricant circulated in circuit 14 is a second refrigerant.

In the exemplary embodiment, the second refrigerant is a low pressure-type refrigerant (e.g., lower vapor pressure for typical chiller cooler saturation temperatures). The second refrigerant comprises chlorine, which facilitates reducing wear on compressor components (e.g., bearings) and provides for oil-free lubrication for refrigeration system 10. For example, the second refrigerant may be 1233zd(e). However, the second refrigerant may be any suitable chlorine containing refrigerant that enables system 10 to function as described herein. Additionally, the second refrigerant may include an extreme pressure additive and/or anti-wear additive, which may further enhance boundary lubrication properties of compressor 16. The extreme pressure additive facilitates forming a film over components at high contact pressures and temperatures, while the anti-wear additive facilitates forming a film at lower pressures and temperatures. In one embodiment, the extreme pressure additive and/or anti-wear additive may include sulfur and/or phosphorous. However, the second refrigerant may include any suitable extreme pressure and/or anti-wear additive that enables system 10 to function as described herein.

Figure 2:
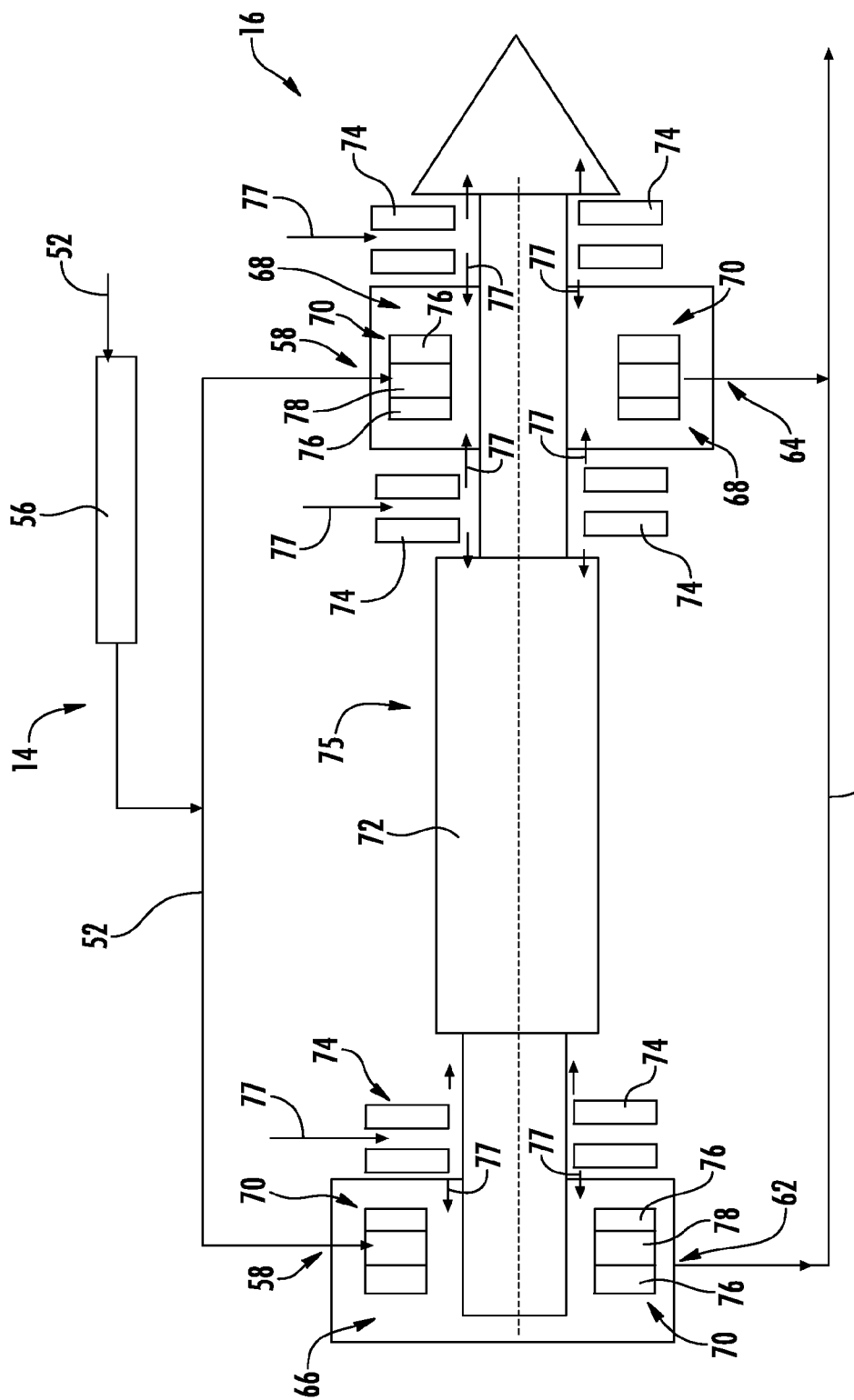
FIG. 2 is a schematic illustration of an exemplary compressor of the refrigeration system shown in FIG. 1.

FIG. 2 illustrates compressor 16 in more detail. In the exemplary embodiment, compressor 16 is a centrifugal compressor. However, compressor 16 may be any type of compressor requiring lubrication, such as a screw compressor. Compressor 16 includes a first bearing chamber 66 and a second bearing chamber 68 that each include a bearing assembly 70 rotatably supporting a shaft 72. Although compressor 16 is illustrated with two bearing assemblies 70, compressor 16 may have any suitable number of bearing assemblies and chambers that enable compressor 16 to function as described herein. Bearing chambers 66, 68 are fluidly coupled to lubricant inlet 58 and respective lubricant outlets 62, 64, and a plurality of labyrinth seals 74 seal a rotor bore (not shown) from bearing chambers 66, 68.

In the exemplary embodiment, each bearing assembly 70 includes angular contact bearings 76 having a lube spacer 78 therebetween. However, bearing assembly 70 may have any suitable type of bearing that enables compressor 16 to function as described herein. As shown in FIG. 2, supply conduit 52 supplies the lubricant through compressor lube inlets 58 and into lube spacers 78 to lubricate bearings 76.

In operation, refrigeration system 10 is operated at a medium or high pressure, and uses a conventional medium or high pressure refrigerant (e.g., higher vapor pressure for typical chiller cooler saturation temperatures, such as 1234ze, R410A). At this system pressure corresponding to medium/high pressure, the low pressure-type second refrigerant (e.g., 1233zd(e)) is in liquid form.

The second refrigerant is stored in reservoir 54, which is maintained at compressor impeller discharge pressure by a return line 82 (FIG. 1). Pump 50 circulates the second refrigerant from reservoir 54 to cooler 40 where the second refrigerant is subcooled by indirect heat exchange with reduced pressure first refrigerant flowing through branch conduit 36. The liquid second refrigerant is subcooled to approximately 50° F. and, after passing through filter 56 to remove particulates, is flowed through lubricant supply line 52 into compressor 16 via lube inlets 58.

After passing through lube inlets 58, the second refrigerant enters bearing chambers 66, 68 and lubricates and cools bearings 76. Due to the inclusion of chlorine, the extreme pressure additive, and/or the anti-wear additive, the second refrigerant provides sufficient lubrication to bearings 76. During lubrication, relatively high pressure first refrigerant gas 77 from compressor outlet 26 or the compressor impeller outlet (not shown) is injected into labyrinth seals 74. This high pressure gas leaks into bearing chambers 66, 68 and facilitates preventing the second refrigerant from escaping into a motor housing 75 (FIG. 2) of compressor 16 and ultimately to evaporator 22. After lubricating bearings 76, the first and second refrigerants exit compressor 16 via lubricant outlets 62, 64 and return to reservoir 54 through return conduit 60. The first refrigerant vapor is subsequently returned back to compressor 16 downstream of inlet guide vanes 80 via return line 82.

In operation of refrigerant circuit 12, gaseous first refrigerant is supplied to compressor inlet 32 via conduit 34 where the gas is compressed in compressor 16 and increased in temperature and pressure. The gas is subsequently supplied through conduit 28 to condenser 18 where the gas is cooled and condensed to a liquid.

A portion of the liquid is supplied through branch conduit 36 where it is reduced in pressure by expansion device 38 and provided to cooler 40 for cooling of the second refrigerant. The first refrigerant may be vaporized by the heat exchange and subsequently provided to evaporator 22. Another portion of the high pressure liquid is supplied through conduit 30 where it is reduced in pressure by expansion device 20 and provided to evaporator 22 where it is evaporated into the gaseous first refrigerant to be supplied to compressor 16.

Figure 3:
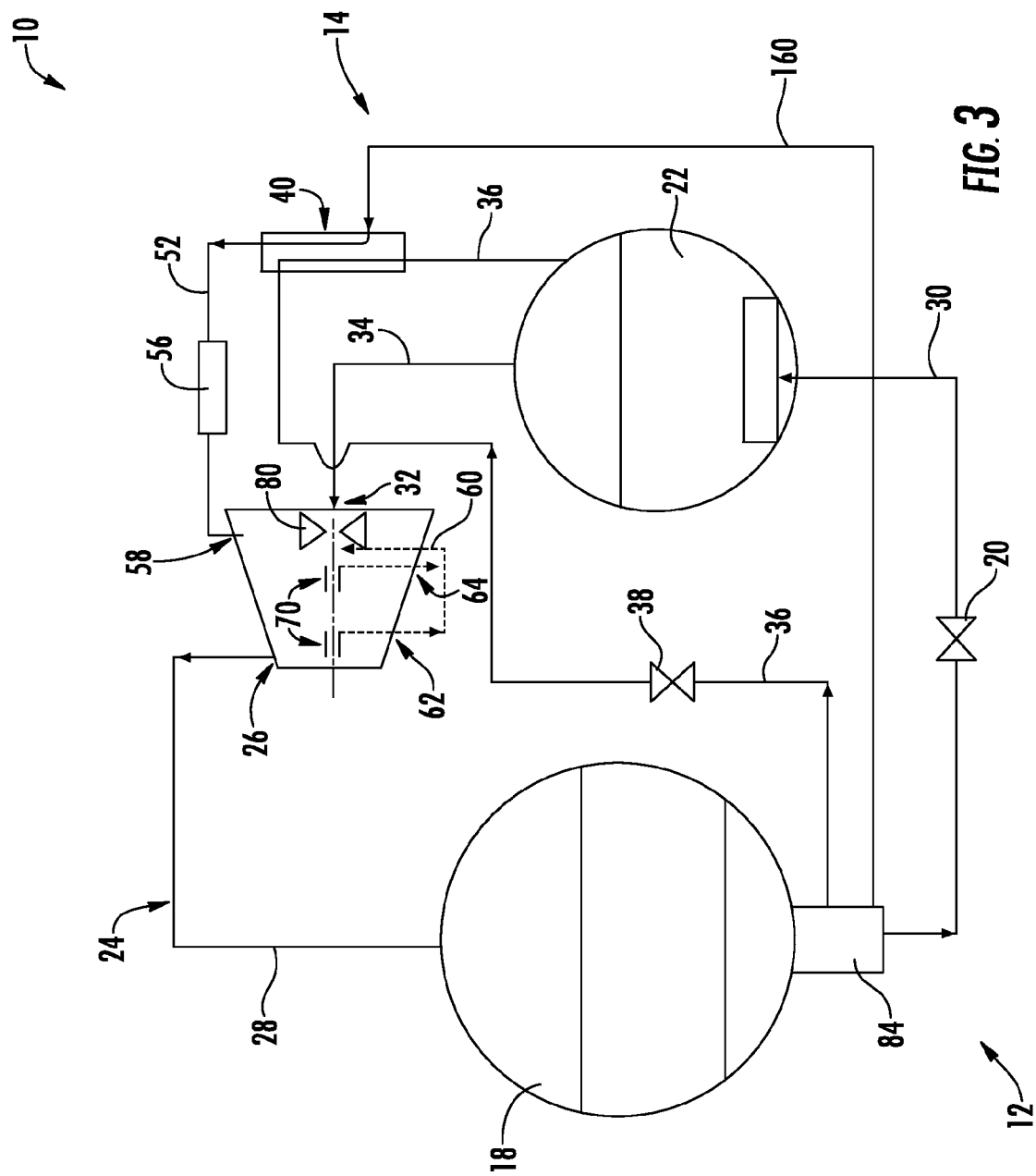
FIG. 3 is a schematic illustration of another exemplary refrigeration system.

FIG. 3 illustrates a refrigeration system 100 that is similar to refrigeration system 10, and like reference numerals indicate like components. System 100 is similar to system 10, except lubricant circuit 14 shares a portion of refrigerant circuit 12 such that the first refrigerant and the second refrigerant (lubricant) are mixed within conduit 24 between compressor 16 and condenser 18. However, the first and second refrigerants are subsequently separated in a refrigerant separation device 84 downstream of condenser 18. Further, as illustrated, lubricant circuit 14 includes a lubricant return line 160 fluidly coupled between separation device 84 and cooler 40 rather than the configuration of reservoir 54, pump 50, and pressure line 82. This enables return conduit 60 to return the used second refrigerant to a point downstream of inlet guide vane 80 for mixing with the first refrigerant.

Figure 4:
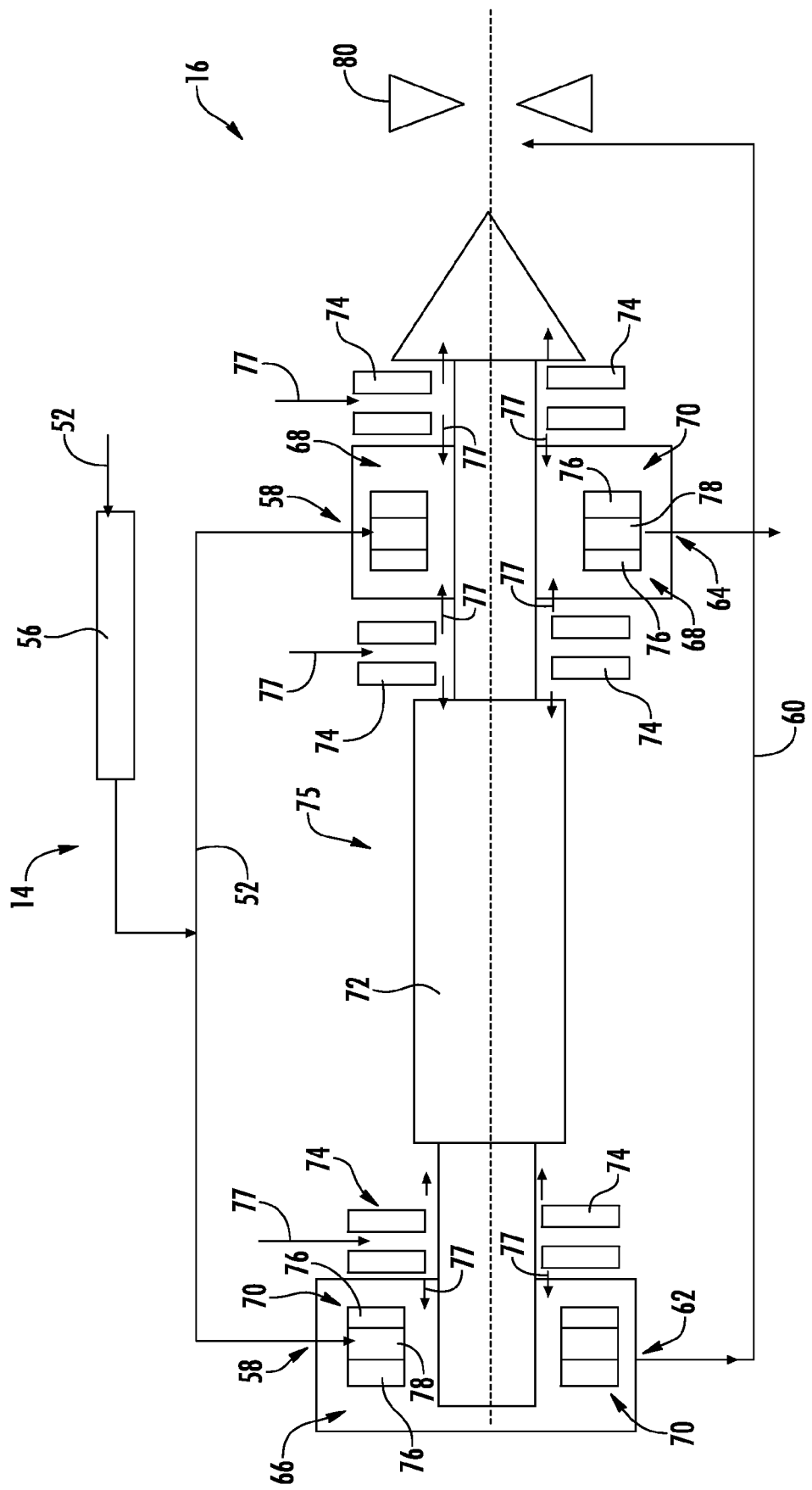
FIG. 4 is a schematic illustration of an exemplary compressor of the refrigeration system shown in FIG. 3.

With reference to FIGS. 3 and 4, in operation, the second refrigerant is subcooled in cooler 40 and, after passing through filter 56, is supplied through supply line 52 to compressor 16. The second refrigerant lubricates bearings 76 while high pressure first refrigerant gas 77 from compressor outlet 26 or the compressor impeller outlet (not shown) is injected into labyrinth seals 74 and bearing chambers 66, 68 After lubricating bearings 76, the second refrigerant exits compressor 16 into return conduit 60 where the second refrigerant is supplied downstream of inlet guide vane 80. The second refrigerant is mixed with the compressed first refrigerant gas and is supplied to condenser 18 through conduit 28.

The refrigerant mixture is subsequently supplied to separation device 84 where the second refrigerant is separated from the first refrigerant, for example, by settling the higher density, low pressure liquid second refrigerant at a bottom of separation device 84. After separation in device 84, a portion of the first refrigerant is sent through branch conduit 36 to cooler 40 and evaporator 22, and another portion is sent through conduit 30 to evaporator 22. The second refrigerant is returned from device 84 to cooler 40 via return line 160.

A method of lubricating bearings 76 of compressor 16 includes subcooling the second refrigerant in cooler 40 and supplying the subcooled second refrigerant to bearing chambers 66, 68 to lubricate bearings 76. High pressure compressor discharge gas 77 is supplied to seals 74 and chambers 66, 68. The second refrigerant is then returned via return conduit 60 to reservoir 54 or downstream of inlet guide vane 80.

Described herein are oil-free systems and methods of lubricating a compressor in a refrigeration system. By utilizing a low pressure refrigerant as a lubricant, an oil lubrication system is not required. Further, by using a refrigerant lubricant that includes chlorine (e.g., 1233zd(e)) and optionally an extreme pressure/anti-wear additive, wearing of the compressor bearings is significantly reduced.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A refrigeration system comprising:
a refrigerant circuit comprising a refrigerant conduit fluidly coupling a compressor, a condenser, and an evaporator, the compressor comprising at least one bearing and configured to compress a first refrigerant for circulation through the refrigerant circuit;
a lubricant circuit comprising a lubricant supply conduit fluidly coupled to the compressor to supply the lubricant to the at least one bearing, wherein the lubricant is a second refrigerant different than the first refrigerant;
a cooler, wherein the refrigerant circuit further comprises a branch conduit coupled between the condenser and the cooler to supply the first refrigerant to the cooler, and
wherein the lubricant circuit further comprises a return conduit to supply the second refrigerant to the cooler such that the first and second refrigerants are in indirect heat exchange within the cooler.

2. The refrigeration system of claim 1, wherein the branch conduit is further fluidly coupled between the cooler and the evaporator, and the refrigerant conduit is fluidly coupled between a refrigerant separation device and the evaporator.

3. The refrigeration system of claim 1, wherein the second refrigerant comprises at least one of chlorine and an extreme pressure additive.

4. The refrigeration system of claim 1, wherein the second refrigerant comprises 1-Chloro-3,3,3-trifluoropropene.

* * * * *